United States Patent [19]
Boucheret

[11] Patent Number: 6,098,948
[45] Date of Patent: Aug. 8, 2000

[54] DEVICE FOR THE RESILIENT FASTENING OF AN ELECTRIC MOTOR WITHIN A HOUSING, ESPECIALLY FOR A MOTOR VEHICLE

[75] Inventor: Bernard Boucheret, Gennevilliers, France

[73] Assignee: Valeo Climatisation, La Verriere, France

[21] Appl. No.: 08/625,543

[22] Filed: Apr. 1, 1996

[30] Foreign Application Priority Data

Apr. 3, 1995 [FR] France .................................. 95 03893

[51] Int. Cl.[7] ...................................................... F16M 1/00
[52] U.S. Cl. ......................... 248/603; 248/634; 248/638; 248/674
[58] Field of Search ..................... 248/603, 604, 248/634, 638, 672, 674, 675

[56] References Cited

U.S. PATENT DOCUMENTS

| | | | |
|---|---|---|---|
| 2,451,970 | 10/1948 | Odor | 248/603 |
| 2,717,748 | 9/1955 | Martinet | 248/634 |
| 2,838,262 | 6/1958 | Anderson | 248/603 |
| 4,492,130 | 1/1985 | Lamy et al. . | |
| 4,648,579 | 3/1987 | Wilson | 248/638 |
| 5,246,196 | 9/1993 | Rollett | 248/674 |
| 5,261,648 | 11/1993 | Kardos | 248/638 X |
| 5,533,704 | 7/1996 | Fischinger | 248/603 |

FOREIGN PATENT DOCUMENTS

| | | |
|---|---|---|
| 0 072 465 | 7/1982 | European Pat. Off. . |
| 823124 | 10/1951 | Germany ............................ 248/638 |
| 41 36 485 A1 | 5/1993 | Germany . |
| 43 06 588 A1 | 1/1994 | Germany . |
| 433 850 | 8/1935 | United Kingdom . |

OTHER PUBLICATIONS

French Search Report Jan. 26, 1996.

*Primary Examiner*—Derek J. Berger
*Attorney, Agent, or Firm*—Morgan & Finnegan, L.L.P.

[57] ABSTRACT

A motor having radial fastening lugs received damping elements which are adapted to be lodged in matching cavities defined within a housing, with each of the said cavities having open radial and axial faces for enabling the said motor to be introduced or removed axially. The device also includes a retaining member, the shape of which is matched to that of the housing, and which includes at least one engagement surface for supporting each damping element in the region of the open axial face of the cavity in which it is lodged, and removable fastening means between the housing and the retaining member, for axially immobilizing each fastening lug within a cavity. The damping elements include on their outer faces a plurality of grooves which enable the retaining member to be trapped axially by the fastening means and, at the same time, elastic decoupling to be obtained in all directions between the motor and the housing.

15 Claims, 2 Drawing Sheets

DEVICE FOR THE RESILIENT FASTENING OF AN ELECTRIC MOTOR WITHIN A HOUSING, ESPECIALLY FOR A MOTOR VEHICLE

This invention relates to a device for the resilient fastening of an electric motor within a housing, especially one adapted to supply an electric current to a motorised fan unit in a motor vehicle.

More particularly, the said invention relates to a fastening device for a motor having radial fastening lugs which receive damping elements adapted to be lodged within matching cavities defined within the housing, each of the said cavities having an open radial face and an open axial face to enable the said motor to be introduced or removed axially.

Such a device is described for example in the publication FR-A-2 693 779.

In that type of device, each damping element bears radially on engagement surfaces which are disposed obliquely on the housing. It is therefore possible under certain conditions to absorb the radial vibrations which occur at right angles to the axis of the motor, for example as a result of a balancing fault, as well as some of the tangential vibrations.

On the other hand, the other vibrations, such as for example axial vibrations, or combinations of at least two vibrations in different directions, are only partially absorbed by these known devices.

In addition, the damping elements are generally made in compact elastic materials. Once their limit of compressibility has been reached, they are unable to perform any further damping function. This particular situation is often encountered on production lines, due to the manufacturing tolerances which are imposed on each element of the device. In some extreme cases it is even impossible to install the motor in the housing, which necessitates the provision of a new motor. This causes time to be lost, and also makes it necessary to carry a large stock of exchange motors.

Consequently, one object of the invention is to provide a resilient fastening means which does not have the drawbacks of the devices of the prior art.

To this end, the invention proposes a resilient fastening device of the type defined in the introduction hereof, in which there are provided:

- a retaining member the shape of which is matched to that of the housing, and which has at least one engagement surface for supporting each damping element in the region of the open axial face of the cavity in which it is lodged,
- removable fastening means between the housing and the retaining member, for immobilising axially each fastening lug within a cavity, and
- damping elements having a plurality of grooves on their outer faces facing towards the cavities.

This enables the retaining member to be trapped axially by the fastening means, and at the same time permits elastic decoupling in all directions between the motor and the housing.

Thus, the cooperation between the retaining member and the damping elements enables the axial vibrations to be absorbed on the one hand, and, on the other hand, enables a device to be made which is particularly simple to assemble or dismantle.

In addition, due to the grooves formed on all of the outer faces of the damping elements, it is possible not only to absorb the axial, radial and tangential vibrations and their combinations, but also to make use of motors in which the dimensions of their fastening lugs define spacings which are slightly greater than those due to manufacturing tolerances.

According to another feature of the invention, the removable fastening means comprise substantially rectangular apertures, each aperture being formed in a closed radial face of each cavity, and projections constituting spigots having a shape matched to the apertures, each spigot being disposed on the retaining member facing an aperture.

As a result of this it is possible, by making a judicious choice of the respective forms of the aperture and the spigot, to take up any axial clearance between at least one of the fastening lugs of the motor and the housing in which they are lodged.

In a preferred embodiment of the invention, by contrast with the known arrangements in which the apertures have faces of the same axial extent, at least the closed radial face is extended axially in its lower part, with the extension thus defined including the aperture.

In addition, in this embodiment, the retaining member is a wall having a central portion which is extended at least at the level of each cavity, firstly by a first terminal portion constituting the engagement surface, and secondly by a second terminal portion which is substantially parallel to the closed radial face and which includes the spigot.

In this way, cavities are formed, with each of them having an extension on which the retaining member is clipped by means of the said spigots, with the said member constituting a closure piece which is open in the centre to enable the motor to pass through it. This embodiment enables some flexibility to be obtained, which increases even more the capacity of the device to absorb vibrations and to accept elements having dimensions slightly greater than the tolerances that are imposed.

According to yet another feature of the invention, the grooves are disposed axially, radially and tangentially on the outer faces of the damping elements. In a preferred embodiment of the damping elements, their front radial face has tangential grooves, their lower and upper faces have radial grooves, and their lateral faces have axial grooves.

As the man in the art knows, each outer face of a damping element works in a preferential direction. In consequence, by forming grooves which extend in a chosen direction on a given face, their respective action can be reinforced.

In the following description, which is given by way of example, reference is made to the accompanying drawings, in which.

Figure 1:
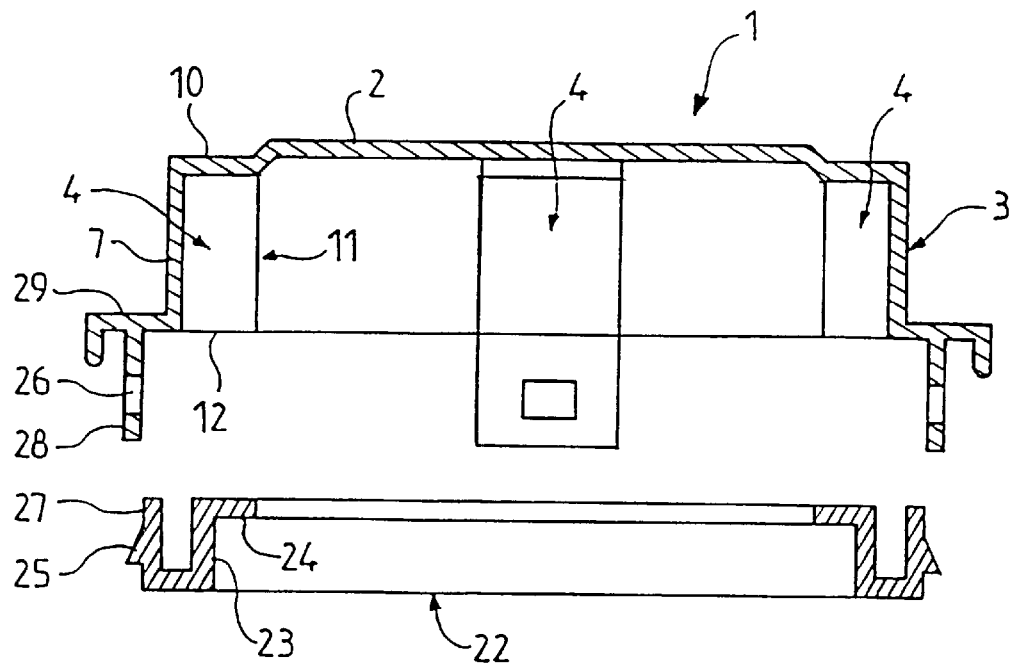
FIG. 1 is a view in transverse cross section, in the median plane, of a fastening device in accordance with the invention, before being assembled.
Figure 2:
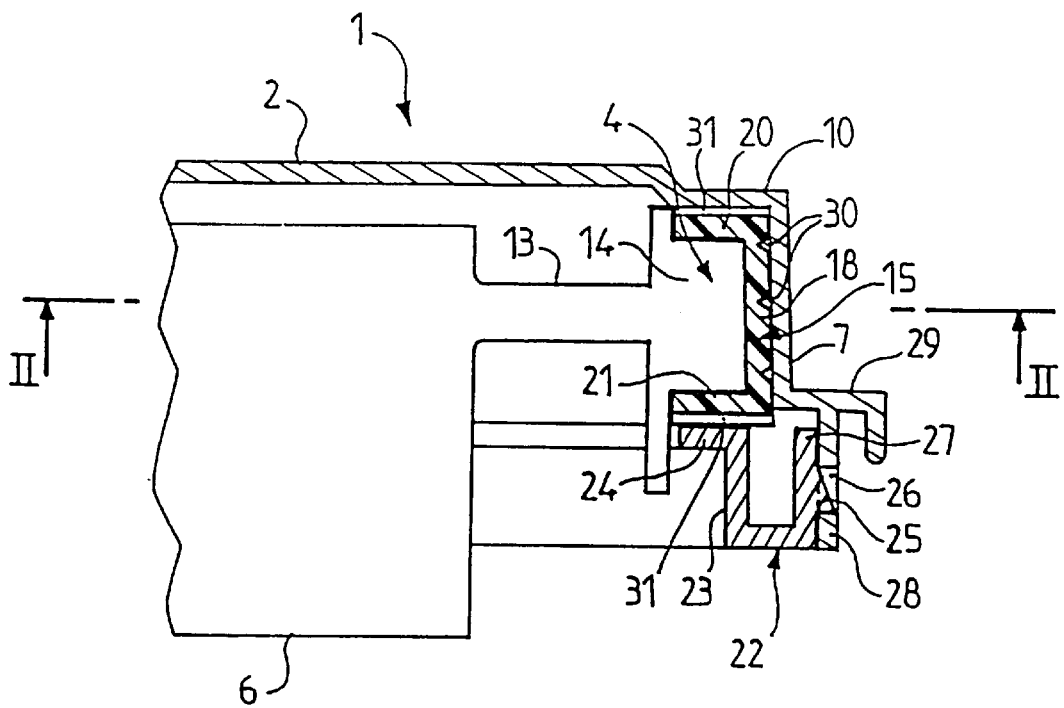
FIG. 2 is a view in transverse cross section on an enlarged scale, showing the device of FIG. 1 after the motor has been introduced and the device assembled.

The fastening device shown in FIG. 1 comprises a housing 1 which is made in one single piece, preferably in moulded plastics.

The housing 1 has an upper surface 2 which is substantially circular and which is extended at right angles by a generally cylindrically side surface 3. This side surface 3 includes four cavities 4, which project radially outwardly of the housing and which are open to the interior of the said housing, each cavity being disposed symmetrically with respect to the centre of the said housing 1, at 90° to its two closest neighbours.

Figure 3:
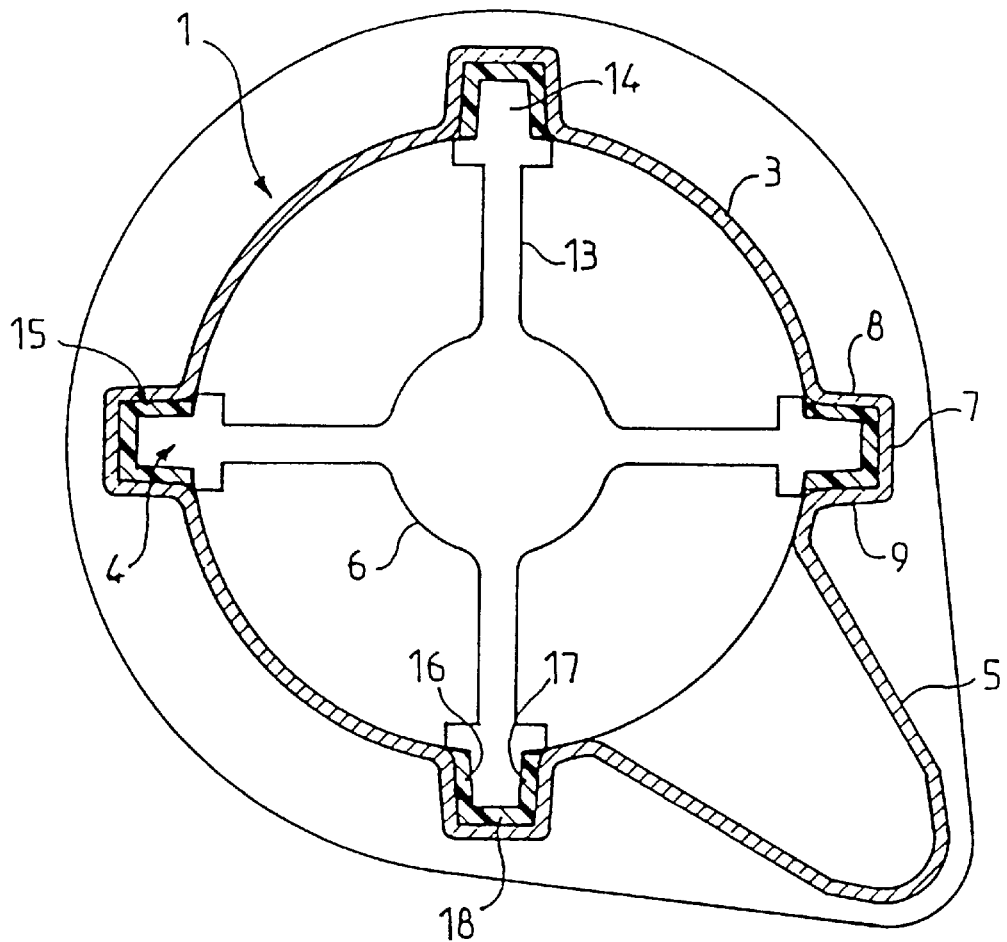
FIG. 3 is a top plan view, in longitudinal cross section taken on the axis II—II in FIG. 2, of the device equipped with the motor.

It is also possible to provide on the side face 3, as is shown in FIG. 3, a further cavity 5 which projects outwardly and which constitutes an axial air circulation duct, for example for cooling the motor 6 of the motorised fan unit of the heating and/or air conditioning system for a motor vehicle.

Each cavity 4 has four closed faces (a front radial face 7, two lateral faces 8 and 9 and an upper axial face 10), and two open faces (a rear radial face 11 and a lower axial face 12).

The motor 6 is equipped with four fastening lugs 13 which extend radially, and which comprise an end portion 14 the shape of which is matched to that of a cavity 4, so as to cooperate with the latter.

Each end portion 14 of a fastening lug 13 is equipped with a removable damping element 15 of resilient material, in the form of a five-sided cap having two lateral faces 16 and 17, a front radial face 18, an upper axial face 20, and a lower axial face 21.

These damping elements 15 are adapted to serve as vibration dampers, in particular between the electric motor 6 and the housing 1. For this purpose, the damping elements 15 preferably have a transverse cross section which is slightly trapezoidal. This preferred form is obtained by making a front radial face 18 with a thickness which increases linearly in the axial direction.

Thus equipped with the damping elements 15, the fastening lugs 13 are introduced into the cavities 4 through the rear radial slots 11 and lower axial slots 12, which are open.

The lateral faces 16 and 17, the front radial face 18 and the upper axial face 20 of each damping element 15 thus bears, tangentially, radially and axially, respectively, on the faces of the cavities 4 with which they are in facing relationship.

The ends of the fastening lugs 13 are thus retained partially in their respective cavities.

The lower axial face 21 of each damping element 15 is supported by a retaining member 22 constituting an annular closure piece. This member has a central aperture to enable the lower part of the motor 6 to pass through.

The member 22 includes a wall, which is preferably moulded and which has a central portion 23 that is substantially parallel, over its whole contour, to the side surface 3 of the housing 1, and which is extended in its upper part, at least in the region of each cavity 4, by a perpendicular first terminal portion 24 which defines an engagement surface for the lower axial faces 21 of the damping elements.

Preferably, for reasons of solidity, the first terminal portion 24, constituting a support, extends the central portion 23 over the whole of its circular perimeter.

The retaining member 22 is fixed to the housing 1 by removable fastening means 25 and 26 which these latter respectively include.

Preferably these means 25 and 26 are, respectively, spigots and apertures having a profile matched to the said spigots.

The spigots 25 are located on the retaining member 22, preferably on second terminal portions 27 which extend the central portion 23, at least in the region of each cavity 4.

In a preferred embodiment, the second terminal portion 27 is substantially parallel to the central portion 23, with which it forms a structure having a U-shaped transverse cross section.

Each spigot 25 thus cooperates with an aperture 26 of substantially rectangular form. The apertures 26 are formed in additional faces 28 which, respectively, extend at least each radial front face 7 of the cavity 4. The axial extension of a radial front face is thus greater than that of the other faces of a cavity.

In the preferred embodiment of the invention, each additional face 28 is slightly displaced with respect to the plane in which lies the front radial face 7 towards which it faces. It is possible to arrange, for this purpose, that the radial faces are extended at right angles by lateral faces 29, which are themselves extended at right angles by the additional faces 28.

It is of course possible to provide other embodiments in which the side surface 3 of the housing 1 includes such an annular axial extension over its whole perimeter, or in which only the radial face 7 and the lateral faces 8 and 9 of each cavity 4 are extended by the additional faces 28.

In this latter case, the front radial faces 7 and the lateral faces 8 and 9 of each cavity have the same axial extent.

The retaining member 22 may thus be partly integrated into the housing 1, and be fixed to the latter by cooperation of the spigots 25 with the apertures 26.

Since the apertures 26 also have slightly greater dimensions than those of the spigots 25, it is possible to compensate for any axial clearance that may be caused to exist by manufacturing tolerances.

This leads to a major advantage, because it is no longer necessary to reject components the axial dimensions of which do not conform exactly to the dimensions of the housings.

Figure 4:
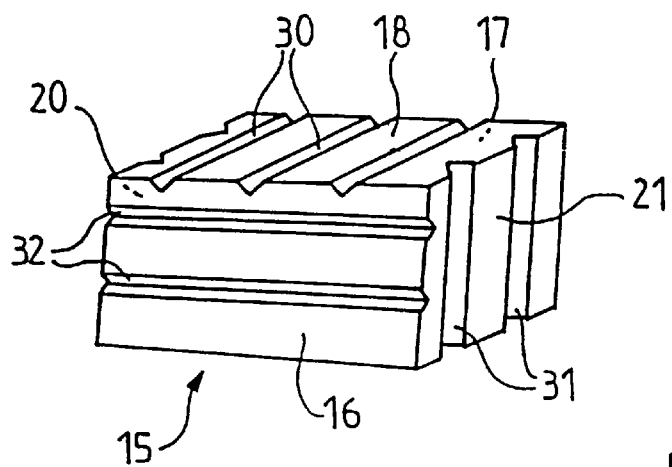
FIG. 4 is a threequarter view of a damping element in accordance with the invention.

Reference is now made to FIG. 4, in order to describe the preferred embodiment of the damping elements in accordance with the invention.

In order to give the best absorption of vibrations, and of any combinations thereof, grooves are formed on the outer faces of the damping elements 15, i.e. on those faces which face towards the apertures 4, the orientations of these grooves depending on which face of the cavity they lie facing towards.

Thus, so-called "tangential" grooves 30 are formed on the front radial face, so called "radial" grooves 31 are formed on the lower axial face 21 and upper axial face 20, and so-called "axial" grooves 32 are formed on the lateral faces 16 and 17.

These grooves also give another advantage, because they enable electric motors to be used in which the fastening lugs 13 are dimensioned with spacings slightly greater than the manufacturing tolerances.

The invention of course is not limited to the embodiment described above. Other versions can be envisaged for the means for fastening the retaining member on the housing 1, for example by positioning the spigots 25 on the additional faces 28 and the apertures 26 on the second terminal portions 27 of the retaining member. However, any other removable fastening means may be envisaged, on condition that it remains within the scope of the Claims given below.

In addition, the fastening device described above is adapted for a motor having four fastening lugs, but it is clear that it will be possible to provide housings having a smaller or greater number of cavities, according to the number of fastening lugs of the electric motor.

Finally, the retaining member 22 could comprise a wall having a central portion identical to that described above and including part of the fastening means, such as for example the spigots 25, the latter being extended at right angles by a first end portion of the same type as that described above, for supporting the lower axial face 21 of the damping elements 15. Such a retaining member would have a transverse cross section in the form of a reversed letter L.

What is claimed is:

1. A device for the resilient fastening of an electric motor having a plurality of fastening lugs, wherein each of said fastening lugs extends radially from said motor and terminates at an end portion, said device comprising:
- a housing including a plurality of cavities;
- a plurality of damping elements, each of said damping elements having a first surface and a second surface, wherein said first surface is adapted to receive said end portion of one of said fastening lugs and said second surface is adapted to be received within one of said cavities;
- a retaining member having at least one engagement surface for supporting said damping elements within their respective cavities;
- a means for detachably coupling said housing and said retaining member for restricting the movement of said motor relative to said housing in at least an axial direction; and
- a plurality of grooves formed on said second surface of each of said damping elements.

2. A device according to claim 1, wherein said retaining member engagement surface comprises an annular ring dimensioned to support said damping elements within their respective cavities when said retaining member is coupled to said housing.

3. A device according to claim 2, wherein:
- said retaining member further comprises an annular wall extending substantially perpendicular to said annular ring engagement surface;
- said housing further comprises a plurality of tabs extending substantially parallel to said retaining member annular wall; and
- said coupling means comprises a plurality of spigots formed on said annular wall and a plurality of apertures formed in said plurality of tabs, wherein each of said apertures is dimensioned to receive a respective one of said spigots when said retaining member is coupled to said housing.

4. A device according to claim 3, wherein said damping element second surface comprises a plurality of faces, at least one of said faces includes said grooves.

5. A device according to claim 4, wherein each of said damping elements is composed of resilient material and defines a hollow structure, and said damping element second surface comprises five faces.

6. A device according to claim 1, wherein said damping element second surface comprises a plurality of faces, at least one of said faces includes said grooves.

7. A device according to claim 6, wherein each of said damping elements is composed of resilient material and defines a hollow structure, and said damping element second surface comprises five faces.

8. A device according to claim 1, wherein said coupling means comprises a plurality of spigots formed on said retaining member and a plurality of apertures formed in said housing, wherein each of said apertures is dimensioned to receive a respective one of said spigots when said retaining member is coupled to said housing.

9. A device for the resilient fastening of an electric motor having a plurality of fastening lugs, wherein each of said fastening lugs extends radially from said motor and terminates at an end portion, said device comprising:
- a housing including a plurality of cavities, each of said cavities having an open rear radial face and an open lower axial face, wherein said open rear radial face is in a plane generally parallel to a longitudinal axis of said housing and said open lower axial face is in a plane generally perpendicular to said housing longitudinal axis;
- a plurality of damping elements, each of said damping elements having an interior surface and an exterior surface, wherein said interior surface is dimensioned to receive said end portion of one of said fastening lugs and said exterior surface is dimensioned to be received within one of said cavities, said exterior surface of said damping elements having a plurality of grooves;
- a retaining member having at least one engagement surface dimensioned to support said damping elements within their respective cavities when said retaining member is coupled to said housing; and
- means for detachably coupling said housing and said retaining member for restricting the movement of said motor relative to said housing.

10. A device according to claim 9, wherein the retaining member further comprises an annular ring having an engagement surface dimensioned to abut said open lower axial face of each of said cavities when said retaining member is coupled to said housing, and an annular wall extending substantially perpendicular to said annular ring engagement surface.

11. A device according to claim 10 wherein said housing further comprises a plurality of tabs extending substantially parallel to said annular wall when said housing is detachably coupled to said retaining member.

12. A device according to claim 11, wherein said coupling means comprises a plurality of spigots formed on said retaining member annular wall and a plurality of apertures formed in said housing tabs, wherein each of said apertures is dimensioned to receive one of said spigots when said retaining member is coupled to said housing.

13. A device according to claim 9, wherein said damping element exterior surface comprises a plurality of faces, at least one of said faces having said grooves.

14. A device according to claim 13, wherein said damping element is composed of resilient material and defines a hollow structure, and said damping element exterior surface comprises five faces.

15. A device for the resilient fastening of an electric motor having a plurality of fastening lugs, wherein each of said fastening lugs extends radially from said motor and terminates at an end portion, said device comprising:
- a housing including a plurality of cavities, each of said cavities having an open rear radial face and an open lower axial face, wherein said open rear radial face is in a plane parallel to a longitudinal axis of said housing and said open lower axial face is in a plane perpendicular to said housing longitudinal axis, said housing further including a plurality of tabs extending below said open lower axial face in a plane parallel to said housing longitudinal axis;
- a plurality of damping elements, each of said damping elements is composed of resilient material and defines a hollow structure having an interior surface and an exterior surface, wherein said interior surface is dimensioned to receive said end portion of one of said fastening lugs and said exterior surface includes five faces and is dimensioned to be received within one of said cavities;
- a retaining member comprising an annular ring having an engagement surface dimensioned to support said damping elements winthin their respective cavities when said retaining member is coupled to said housing, and an annular wall extending substantially perpendicular to said annular ring engagement surface;
- a removeable fastening means comprising a plurality spigots formed on said retaining member annular wall and a plurality of aperatures formed in said housing tabs, wherein each of said apertures is dimensioned to receive a respective one of said spigots when said retaining member is coupled to said housing; and a plurality of grooves formed an at least one of said five faces of said damping element exterior surface.

* * * * *